US012811246B2

(12) United States Patent
Plappert et al.

(10) Patent No.: US 12,811,246 B2
(45) Date of Patent: Nov. 24, 2026

(54) SEPARATOR INCLUDING FIBRILLATED FIBERS OF REGENERATED CELLULOSE AND PULP, PROCESS FOR MANUFACTURING, AND ELECTROCHEMICAL ELEMENTS INCLUDING THE SAME

(71) Applicant: DELFORTGROUP AG, Traun (AT)

(72) Inventors: Sven Plappert, Schwaz (AT); Dietmar Volgger, Gnadenwald (AT); Christian Mair, Fritzens (AT)

(73) Assignee: DELFORTGROUP AG, Traun (AT)

( * ) Notice: Subject to any disclaimer, the term of this patent is extended or adjusted under 35 U.S.C. 154(b) by 711 days.

(21) Appl. No.: 18/247,568

(22) PCT Filed: Oct. 11, 2021

(86) PCT No.: PCT/EP2021/078052
§ 371 (c)(1),
(2) Date: Mar. 31, 2023

(87) PCT Pub. No.: WO2022/078959
PCT Pub. Date: Apr. 21, 2022

(65) Prior Publication Data

US 2024/0021954 A1 Jan. 18, 2024

(30) Foreign Application Priority Data

Oct. 13, 2020 (DE) ..................... 10 2020 126 899.8

(51) Int. Cl.
*H01M 50/44* (2021.01)
*H01G 11/52* (2013.01)
(Continued)

(52) U.S. Cl.
CPC ............ *H01M 50/44* (2021.01); *H01G 11/52* (2013.01); *H01M 10/0525* (2013.01);
(Continued)

(58) Field of Classification Search
CPC ............. H01M 50/44; H01M 50/4295; H01M 50/403; H01M 50/491; H01M 50/494; H01M 10/0525; H01G 11/52
(Continued)

(56) References Cited

U.S. PATENT DOCUMENTS 5,047,121 A 9/1991 Kochar
6,352,660 B1 3/2002 Friedrich et al.
(Continued)

FOREIGN PATENT DOCUMENTS

CN 1215768 A 5/1999
CN 108140492 A 6/2018
(Continued)

OTHER PUBLICATIONS

Odabas et al. Cellulosic fines: Properties and effects, Jul. 2016, Progress in Materials Science, 83, 574-594 (Year: 2016).*
(Continued)

*Primary Examiner* — Sean P Cullen
(74) *Attorney, Agent, or Firm* — Barclay Damon LLP

(57) ABSTRACT

What is shown is a separator for an electrochemical element, wherein at least 70% and at most 95% of the mass of the separator is formed by fibrillated fibers of regenerated cellulose and at least 3% and at most 30 % of the mass of the separator is formed by cellulose having a high fines content, wherein at least 10%, based on number, of the fibrillated fibers of regenerated cellulose having a length of at least 1 mm have a branched structure, and wherein, in the cellulose having a high fines content, the proportion of fibers having a length of less than 0.2 mm is at least 70% based on the sum of the length of the fibers in the cellulose having a high fines content.

31 Claims, 8 Drawing Sheets

(51) Int. Cl.

| | |
|---|---|
| ***H01M 10/0525*** | (2010.01) |
| ***H01M 50/403*** | (2021.01) |
| ***H01M 50/429*** | (2021.01) |
| ***H01M 50/491*** | (2021.01) |
| ***H01M 50/494*** | (2021.01) |

(52) U.S. Cl.
CPC ..... *H01M 50/403* (2021.01); *H01M 50/4295* (2021.01); *H01M 50/491* (2021.01); *H01M 50/494* (2021.01)

(58) Field of Classification Search
USPC .................................................. 429/251, 255
See application file for complete search history.

(56) References Cited

U.S. PATENT DOCUMENTS

| | | | | |
|---|---|---|---|---|
| 11,063,319 | B2 | 7/2021 | Igawa et al. | |
| 2008/0216942 | A1* | 9/2008 | Hiraoka | B01D 67/00933 156/145 |
| 2010/0252426 | A1* | 10/2010 | Tsukuda | H01M 50/423 156/247 |
| 2017/0373294 | A1 | 12/2017 | Fukunaga et al. | |
| 2018/0274174 | A1 | 9/2018 | Tanaka et al. | |
| 2019/0067660 | A1* | 2/2019 | Fukunaga | H01M 50/491 |

FOREIGN PATENT DOCUMENTS

| | | | |
|---|---|---|---|
| DE | 691 09 418 | T2 | 1/1996 |
| JP | 2014-051767 | A | 3/2014 |
| JP | 2015-162281 | A | 9/2015 |
| JP | 6076278 | B2 | 2/2017 |
| JP | 2016171048 | A * | 9/2019 |
| WO | 2019/064205 | A1 | 4/2019 |
| WO | 2019/131588 | A1 | 7/2019 |

OTHER PUBLICATIONS

International Searching Authority/EP, International Search Report and Written Opinion of the International Searching Authority, Application No. PCT/EP2021/078052, dated Jan. 27, 2022, 10 pages.

Japanese Patent Office, Notification of Reason for Rejection, Application No. 2023-521177, dated Jul. 24, 2026, 8 pages.

China National Intellectual Property Administration, Notification of the First Office Action, Application No. 202180068649.5, dated Jul. 10, 2026, 12 pages.

* cited by examiner

SEPARATOR INCLUDING FIBRILLATED FIBERS OF REGENERATED CELLULOSE AND PULP, PROCESS FOR MANUFACTURING, AND ELECTROCHEMICAL ELEMENTS INCLUDING THE SAME

CROSS-REFERENCE TO RELATED APPLICATIONS

This application is the national phase entry of International Patent Application No. PCT/EP2021/078052, filed Oct. 11, 2021, and claims the benefit of German Patent Application No. 10 2020 126 899.8, filed Oct. 13, 2020, the disclosures of which are incorporated herein by reference in their entirety.

FIELD OF THE INVENTION

The invention relates to a separator for electrochemical elements which is formed by a fiber substrate that consists essentially of fibrillated fibers of regenerated cellulose and pulp having a high fines content. Such a separator has particularly beneficial properties in particular with respect to the pore size distribution.

BACKGROUND AND PRIOR ART

An electrochemical element typically comprises at least a positive electrode, a negative electrode, an electrolyte, a separator, a casing, and current collectors. The separator is impregnated with the electrolyte and has the task of electrically separating the two electrodes. In this regard, it should also, as far as possible, enable a flow of ions between the electrodes which is as unhindered as possible, so that the electrochemical element has advantageous properties, in particular rapid charging and the option to draw high currents.

These requirements on the separator mean that it should be as thin as possible, so that the path of the ions from one electrode to the other through the pores of the separator is short and a high volumetric energy density of the electrochemical element is achieved, and it should have a high porosity. In particular, if the electrochemical element is an accumulator, the porosity should not be formed by a few large pores, but rather by a large number of small pores, because small pores can inhibit the growth of crystals, in particular dendrites, on the electrodes. These crystals can short-circuit the accumulator and thus reduce its life span and performance. A very large number of small but same-sized pores, as far as possible, is desired, i.e. a pore size distribution with a small standard deviation.

Furthermore, the separator should be chemically stable with respect to the electrolyte, because electrochemical elements can be re-charged several times and are typically in use for several years. The separator should thus also be stable in oxidative and in reducing environments.

For safety reasons, the separator should also have a good thermal stability to limit the risk of fire in case of damage to the electrochemical element.

Finally, despite of its fine thickness, the separator needs sufficient mechanical strength so that electrochemical elements can be manufactured without problems, and during manufacture, it should absorb the electrolyte into its entire pore volume as quickly as possible in order to obtain a high conductivity for ions.

According to the prior art, this number of requirements can primarily be fulfilled by thin plastic films, which can be manufactured in very uniform quality. The plastics used, typically polyolefins, however, are mostly thermoplastic and often not sufficiently thermally stable, so that problems with fire safety of the electrochemical elements manufactured therefrom may arise, primarily because at high temperatures, the plastics shrink and can no longer prevent large-scale contact between the electrodes.

Attempts to use fibrous substrates as separators for electrochemical elements, in particular for lithium-ion batteries, have little success so far, because fibrous substrates of sufficient strength are often too thick and, due to the raw materials and the production process, the pores are too large, and the standard deviation of the pore size distribution is too high. Above all, separators produced from cellulose fibers have been proven to be difficult in this respect, because they are based on natural raw materials such as pulp fibers, which themselves vary considerably with respect to length, thickness and shape, although cellulosic fibers would offer advantages with respect to safety aspects, in particular dimensional stability at high temperatures, and with respect to ecological aspects.

Despite this unfavorable background, there is an interest in the industry in having separators for electrochemical elements available that are essentially formed from cellulose fibers and have favorable properties for use in electrochemical elements.

SUMMARY OF THE INVENTION

It is an objective of the invention to provide a separator for electrochemical elements which is essentially formed from cellulose fibers and fulfills the requirements regarding thickness, pore size distribution, strength, and chemical stability, so that the advantages with respect to safety and ecology can be utilized in an economically feasible way.

This objective is achieved by means of a separator for electrochemical elements according to claim 1 and a process for manufacturing a separator for electrochemical elements according to claim 26. Further advantageous embodiments are provided in the dependent claims.

The inventors have found that this object can be achieved by means of a separator for electrochemical elements, wherein at least 70% and at most 95% of the mass of the separator are formed by fibrillated fibers of regenerated cellulose and at least 3% and at most 30% of the mass of the separator is formed by pulp having a high fines content, wherein, of the fibrillated fibers of regenerated cellulose which have a length of at least 1 mm, at least 10%, with respect to number, have a branched structure and wherein, in the pulp having a high fines content, the proportion of fibers with a length of less than 0.2 mm is at least 70% with respect to the total length of the fibers in the pulp having a high fines content.

A substantial difficulty in manufacturing fiber substrates which contain fines is retaining the fines in the fiber substrate so that they are not lost during manufacture of the fiber substrate and in further process steps. This difficulty was overcome by the inventors by means of a special refining process, which provides the fibers of regenerated cellulose with a particular morphology. In this regard, the fibers of regenerated cellulose are primarily fibrillated and cut less and for at least a portion of the fibers, branched structures are generated which, according to the findings of the inventors, essentially contribute to retaining the fines in the fiber substrate. The branched structures are primarily characterized in that the fibrils are not completely separated from each other, but still remain connected on one end to a thicker fiber. The branched structures bind to each other via hydrogen bonds and form a network which contributes to high strength and provides the basis for retaining further fibers with a branched structure. In this manner, a sufficiently dense net is generated which can retain the fines. In this regard, the fines primarily serve to reduce the pore size and generate a pore size distribution with a small standard deviation.

Fibrillation of the regenerated cellulose in order to produce the branched structures can be particularly advantageously achieved with a colloid mill.

In this regard, the fibers of regenerated cellulose are refined in a manner such such that a portion of the fibers has a branched structure. According to the invention, at least 10% of all of the fibers of the fibrillated regenerated cellulose with a length of at least 1 mm have such a branched structure. Preferably, the proportion of fibers with a branched structure is higher and is at least 15% and particularly preferably at least 20%, each with respect to number of fibers of the fibrillated regenerated cellulose with a length of at least 1 mm.

The separator according to the invention is formed by at least 70% and at most 95%, preferably by at least 75% and at most 90% with respect to the mass of the separator of fibrillated fibers of regenerated cellulose. This type and quantity of fibers in the separator enables good strength to be obtained, so that the separator can also be processed into an electrochemical element.

The fibers of regenerated cellulose are preferably solvent-spun fibers, particularly preferably YOCELL® fibers (cellulose fibers made from wood pulp).

The linear density of the fibers of regenerated cellulose before fibrillation is of importance to refining the fibers. Preferably, the average linear density of the fibers of regenerated cellulose is at least 0.8 g/10000 m (0.8 dtex) and at most 3.0 g/10000 m (3.0 dtex) and particularly preferably at least 1.0 g/10000 m (1.0 dtex) and at most 2.5 g/10000 m (2.5 dtex).

The length of the fibers of regenerated cellulose before fibrillation is important primarily for the strength of the separator, wherein longer fibers lead to a higher strength, but also mean higher energy consumption during refining. Preferably, the average length of the fibers of regenerated cellulose before fibrillation is at least 2 mm and at most 8 mm and particularly preferably at least 3 mm and at most 6 mm.

The separator according to the invention is formed by at least 3% and at most 30%, preferably at least 5% of pulp having a high fines content and at most 20%, with respect to the mass of the separator. Pulp having a high fines content creates a pore size distribution with a small standard deviation at high porosity. A higher proportion of pulp having a high fines content makes de-watering of the fiber web during manufacturing of the separator on a paper machine more difficult. Additionally, pulp having a high fines content is comparatively difficult to manufacture and is expensive. The specified intervals thus provide a particularly advantageous combination of porosity, strength, cost, and time for de-watering. Fibrillation of the fibers of regenerated cellulose also causes fines to be formed, which can be present in the separator in even larger quantities than the fines of the pulp having a high fines content. According to the findings of the inventors, however, the fines of regenerated cellulose have a coarser structure and thus are not as suitable for obtaining a high porosity with a low average pore size and small standard deviation of the pore size distribution. On the other hand, the fines of the pulp having a high fines content have a finer structure and thus enable the average pore size and the standard deviation of the pore size distribution to be reduced much more effectively, even with a lower total content in the separator. Furthermore, more intense fibrillation of the fibers of regenerated cellulose can barely increase the proportion of fines without destroying the fibers with a branched structure, so that in the context of this invention, the proportion of fines is adjusted by the addition of fines from the pulp having a high fines content.

According to the invention, the pulp having a high fines content is manufactured from pulp, wherein the pulp is preferably sourced from coniferous woods, deciduous woods or other plants such as hemp, flax, jute, ramie, kenaf, kapok, coconut, aback sisal, bamboo, cotton, or esparto grass, or from recycled pulp. In addition, mixtures of pulps of different origins can be used for the manufacture of the pulp having a high fines content. Particularly preferably, the pulps are sourced from deciduous woods or coniferous woods.

According to the invention, the pulp having a high fines content is characterized in that the proportion of pulp fibers with a length of less than 0.2 mm is at least 70% with respect to the total length of the pulp fibers. This means that the sum of the lengths of all pulp fibers with less than 0.2 mm length 1*s* at least 70% of the sum of the lengths of all pulp fibers in the pulp having a high fines content. The fines contribute to further reducing the pore size and to generating a pore size distribution with a small standard deviation at high porosity. Preferably, the fines content in the pulp having a high fines content is thus higher, so that the proportion of pulp fibers with a length of less than mm is at least 80%, particularly preferably at least 90%, each with respect to the total length of the pulp fibers in the pulp having a high fines content. This fines content can be determined by an image analysis method in accordance with ISO 16065-2:2014.

Nano-fibrillated pulp or micro-fibrillated pulp may be well suited as a pulp having a high fines content and is available commercially, for example under the designation EXILVA®-F-01 (microfibrillated cellulose) from the company Borregaard.

In preferred embodiments, the properties of the separator can be improved still further, by adjusting the length and thickness of the fines even more precisely during the manufacturing process of the pulp having a high fines content, so that even shorter and finer fibers are produced, what are known as secondary fines. Secondary fines are fibers the length of which is less than 100 μm and with a thickness D in μm that satisfies the inequality $$D \leq 50 - 0.3 \cdot L,$$

wherein L is to be substituted in μm. Preferably, the proportion of secondary fines in the pulp having a high fines content is at least 40%, particularly preferably at least 60%, each with respect to the total length of the fibers in the pulp having a high fines content. The proportion of secondary fines can also be determined by an image analysis method in accordance with ISO 16065-2:2014. As an example, the L&W Fiber Tester Plus measuring instrument from the company Lorentzen & Wettre can be used for the determination of fiber lengths and fiber thicknesses and their distribution.

The separator according to the invention can contain further components that are suitable for the manufacturing process, which the skilled person can select according to experience; this includes, from example, polyvinyl alcohol, polyethylene glycol, polyvinylidene fluoride, guarana, starch, carboxymethyl cellulose, methylcellulose, dialdehydes, such as glyoxal, and inorganic fillers such as kaolin, titanium dioxide ($TiO_2$), silicon dioxide ($SiO_2$), aluminum oxide ($Al_2O_3$), zirconium dioxide ($ZrO_2$) or calcium carbonate ($CaCO_3$).

Apart from the fibrillated fibers of regenerated cellulose and the pulp having a high fines content, the separator according to the invention can also contain further fibers. This can include, for example, fibers from cellulose derivatives, non-fibrillated fibers from regenerated cellulose, glass fibers, plastic fibers, such as, for example, fibers from polyolefins, such as polyethylene or polypropylene; from polyesters, like polyethylene terephthalate or polylactic acids; from polyethers, polysulfones, polyurethanes, polyamides, polyimides, polyvinyl alcohol, polyacrylonitrile, polyphenylene sulfide or from ethylene-vinyl acetate copolymers.

Preferably, the total proportion of other fibers, however, is at most 10%, particularly preferably at most 5% of the mass of the separator.

The separator according to the invention should be thin so that the ions flowing in the electrolyte need only cover a short path through the pores of the separator between the two electrodes and so that the electrochemical element manufactured therefrom has a high volumetric energy density. On the other hand, a certain thickness is required in order to safely isolate the electrodes electrically from each other and to achieve good strength in the separator. Preferably, the thickness of the separator according to the invention is thus at least 10 μm and at most 55 μm, particularly preferably at least 12 μm and at most 35 μm. The thickness of the separator can be determined on a single sheet in accordance with ISO 534:2011.

The basis weight of the separator provides good strength, however the thickness and material consumption increase with basis weight. Preferably, the basis weight of the separator according to the invention is thus at least 8 $g/m^2$ and at most 30 $g/m^2$, particularly preferably at least 12 $g/m^2$ and at most 25 $g/m^2$. The basis weight can be determined in accordance with ISO 536:2012.

The porosity of a separator is the ratio of the pore volume to the total volume of the separator and is usually expressed as a percentage. The porosity of the separator can be estimated from the thickness and the basis weight, respectively determined in accordance with ISO 534:2011, and the density of the fibers, wherein a density of the fibers of 1500 $kg/m^3$ can be selected. Using these assumptions, the porosity μ can be approximately calculated as the ratio of the pore volume to the total volume of the separator by $$\mu = 1 - \frac{2}{3}\frac{m}{d}$$

wherein m is the basis weight in $g/m^2$ and d is the thickness in lam and the porosity is obtained as a value between 0 and 1 and can be converted to a percentage by multiplying by 100. The porosity should be as high as possible, but is limited from above primarily by the required mechanical strength and the requirement that the pores should be as small as possible. Preferably, the porosity is at least 30% and at most 85%, particularly preferably at least 35% and at most 75%.

The pore size distribution, the mean flow pore size and the standard deviation of the mean flow pore size can be determined by capillary flow porosimetry in accordance with ASTM F316-03(2019) *Standard Test Methods for Pore Size Characteristics of Membrane Filters by Bubble Point and Mean Flow Pore Test*. In this regard, the amount of a medium flowing through the separator is determined with increasing pressure difference. This measurement method is particularly well suited for separators, because it only detects pores that lead through the separator and the narrowest position of each pore determines the flow. These features of the pores are also of importance for conduction of the ions through the separator.

The pores in the separator should not exceed a certain size in order to limit the growth of dendrites on the electrodes and they should all be of the same size, i.e. have a pore size distribution with a small standard deviation. Preferably, the mean flow pore size is thus at least 40 nm and at most moo nm, preferably at least 50 nm and at most 800 nm.

Typically, the pore sizes in the separator according to the invention are unimodally distributed, so that the width of the pore size distribution can be characterized well by the standard deviation for the mean flow pore size. For the separator according to the invention, the standard deviation for the mean flow pore size is thus preferably at least 3 nm and at most 200 nm, particularly preferably at least 3 nm and at most 100 nm. Alternatively or in a complementary manner to the standard deviation of the mean flow pore size, the pore size distribution can also be characterized by the flow pore size $D_{90}$, wherein $D_{90}$ is determined such that 90% of the flow through the pores occurs through pores the flow pore size of which does not exceed the value $D_{90}$. The flow pore size $D_{90}$ is preferably at least 100 nm and at most 1500 nm, particularly preferably at least 200 nm and at most 1000 nm.

The strength of the separator is of importance for processing the separator into an electrochemical element. The strength can be characterized by the tensile strength and be determined in accordance with ISO 1924-2:2008. Due to the type of manufacture and due to the fibers with a branched structure, the tensile strength does not depend particularly strongly on the direction in which the sample has been taken from the separator. Thus, the requirements are held to be fulfilled if they are fulfilled in at least one direction. The tensile strength of the separator according to the invention is at least 0.3 kN/m and at most 2 kN/m, particularly preferably at least 0.5 kN/m and at most 1.5 kN/m. The strength can be increased by more intense refining of the fibers of regenerated cellulose; however, this means a higher energy consumption and the fibers are further shortened thereby, so that the strength cannot be increased arbitrarily.

In the case of automated processing of the separator into an electrochemical element, the elongation of the separator is of importance. The elongation can be described by the elongation at break and can be determined in accordance with ISO 1924-2:2008. Like the tensile strength, the elongation at break also depends on the direction in which the sample is taken from the separator. This dependence is not very pronounced, however, so that the requirements are fulfilled if they are fulfilled in at least one direction. The elongation at break of the separator according to the invention is preferably at least 0.5% and at most 4.0%, particularly preferably at least 1.0% and at most 3.5%.

The elasticity of the separator is also of importance. It can be characterized by the modulus of elasticity, which results from the measurement of the force-strain-curve in accordance with ISO 1924-2:2008. For the separators according to the invention, the modulus of elasticity also depends only slightly on the direction in which the sample has been taken from the separator so that, independently of the direction, the modulus of elasticity is preferably at least 1 GPa and at most 8 GPa, particularly preferably at least 2 GPa and at most 6 GPa.

Because the measurement of the pore size distribution by capillary flow porosimetry is complicated, the pore structure of the separator can be characterized in a simplified manner by the air permeability according to Gurley. The air permeability is also a good indicator as to how quickly the separator can absorb the electrolyte. A high absorption rate is advantageous to production when manufacturing electrochemical elements. The air permeability according to Gurley can be determined in accordance with ISO 5636-5:2013 and is preferably at least 10 s and at most 450 s, preferably at least 40 s and at most 300 s.

The separator can be used in electrochemical elements. An electrochemical element according to the invention comprises two electrodes, an electrolyte, and the separator according to the invention. Preferably, the electrochemical element is a capacitor, a hybrid capacitor, a supercapacitor, or an accumulator, and particularly preferably, the electrochemical element is a lithium-ion battery.

The separator according to the invention can be manufactured by the following process according to the invention which comprises the following steps:

A—Manufacturing an aqueous suspension of fibers of regenerated cellulose which can be fibrillated, B—Fibrillating the fibers of regenerated cellulose from step A, C—Adding the aqueous suspension of fibrillated fibers of regenerated cellulose from step B to a head box, D—Applying the aqueous suspension from step C to a running wire to form a fiber web, E—De-watering the fiber web on the running wire, F—Drying the fiber web in a first drying device, G—Drying the fiber web in a second drying device, H—Winding up the separator formed by the fiber web, wherein the fibers of regenerated cellulose in step C are fibrillated such that of the fibers with a length of at least 1 mm, at least 10% of the fibers, with respect to their number, have a branched structure, and wherein the pulp having a high fines content is added in at least one of the following steps, (a) in step A, by addition to the aqueous suspension, (b) in step C, by addition to the head box, (c) in step D, by application to the fiber web formed on the running wire from a further head box, (d) between the steps E and F, by application to the fiber web in an application device, or (e) between steps G and H, by application to the fiber web in an application device, and Wherein, in the pulp having a high fines content, at least 70% of the fibers with respect to the total length of the fibers have a length of less than 0.2 mm, and wherein at least 70% and at most 95% of the mass of the separator after drying in step G is formed by fibrillated fibers of regenerated cellulose and at least 3% and at most 30% of the mass of the separator is formed by pulp having a high fines content.

In a preferred embodiment of the process according to the invention, step B is carried out such that the fibers of regenerated cellulose are fibrillated more and cut less, and particularly preferably, step B is carried out in a colloid mill. The inventors have found that the formation of the branched structures depends on cutting the fibers less, and a substantial part of the fibrillation is caused by fiber-fiber friction. This type of fibrillation can be carried out in various refining devices, but a colloid mill has proven to be particularly suitable.

In a preferred embodiment, step B is carried out such that the degree of refining in accordance with Schopper Riegler (° SR), measured in accordance with ISO 5267-1:1999, is at least 70° SR and at most too ° SR, particularly preferably at least 80° SR and at most 95° SR. More intense refining, and thus a higher degree of refining in accordance with Schopper Riegler, lead to more fibrils and a higher strength and a finer pore structure. Because the energy consumption is considerable and the fibers are also shortened with increasing intensity of refining, the specified intervals are an advantageous compromise.

By refining the regenerated cellulose in step B, fibers with a length of less than 0.2 mm can be produced the proportion of which, however, should not be very high because the fibers of regenerated cellulose should primarily form a network that retains the fibers of the pulp having a high fines content. Preferably, step B is thus carried out such that in the fibrillated fibers of regenerated cellulose after step B, at least 30% and at most 70%, particularly preferably at least 40% and at most 65% of the total fiber length 1*s* formed by fibers with a length of less than 0.2 mm. This proportion of fibers with a length of less than 0.2 mm can be determined in accordance with ISO 16065-2:2014.

In a preferred embodiment of the process according to the invention, at least steps C to G are carried out on a paper machine.

The drying devices of steps F and G can be different or the same and can preferably be formed by one or more heated drying cylinders.

In a preferred embodiment of the process according to the invention, the fiber web can be calendered between steps G and H. In this regard, the fiber web is passed through at least one nip, wherein mechanical pressure is exerted on the fiber web. Particularly preferably, the number of nips through which the fiber web is passed is at least 2 and at most 14, particularly preferably at least 5 and at most 10. The line load which is exerted on the fiber web in all or at least a part of the nips is preferably at least 20 kN/m and at most 600 kN/m, preferably at least 60 kN/m and at most 400 kN/m. The calendering helps to reduce the thickness of the separator and to compress the structure so that smaller pores are created. In the case in which step (e) is carried out, the calendering is preferably carried out between the steps (e) and H.

In a preferred embodiment of the process according to the invention, the application of at least a part of the pulp having a high fines content is carried out in step (d) by a film press or a coating device.

In a preferred embodiment of the process according to the invention, the application of at least a part of the pulp having a high fines content is carried out in step (e) by printing or spraying. In this preferred embodiment, the application of the pulp having a high fines content can be carried out on one or both sides, and in particular, it is carried out on both sides.

The separator from step H of the process according to the invention is preferably formed by at least 75% and at most 90% fibrillated fibers of regenerated cellulose with respect to the mass of the separator.

The fibrillated fibers of regenerated cellulose from step A of the process according to the invention are preferably solvent-spun fibers, particularly preferably LYOCELL® fibers.

The mean length of the fibrillated fibers of regenerated cellulose in step A of the process according to the invention is at least 2 mm and at most 8 mm and particularly preferably at least 3 mm and at most 6 mm. The mean length of the fibers can be determined in accordance with ISO 16065-2: 2014.

The separator of step H of the process according to the invention is preferably formed by at least 5% and at most 20% pulp having a high fines content with respect to the mass of the separator.

According to the invention, the pulp having a high fines content that is added in at least one of steps (a) to (e) is manufactured from pulp, wherein the pulp is preferably sourced from coniferous woods, deciduous woods or other plants such as hemp, flax, jute, ramie, kenaf, kapok, coconut, aback sisal bamboo, cotton, or esparto grass, or from recycled pulp. In addition, mixtures of pulps from different sources can be used for the manufacture of the pulp having a high fines content. Particularly preferably, the pulps are sourced from coniferous woods or deciduous woods.

According to the invention, the pulp having a high fines content from at least one of the steps (a) to (e) is characterized in that the proportion of fibers with a length of less than 0.2 mm is at least 70% with respect to the total length of the fibers in the pulp having a high fines content. Preferably, the proportion of fibers with a length of less than 0.2 mm is at least 80%, particularly preferably at least 90%, each with respect to the total length of the fibers in the pulp having a high fines content. This content of fines can be determined by an image analysis method in accordance with ISO 16065-2:2014.

The pulp having a high fines content from at least one of steps (a) to (e) can preferably contain secondary fines. Secondary fines are fibers with a length which is less than 100 μm and with a thickness D in μm which satisfies the inequality $$D \leq 50 - 0.3 \cdot L,$$

wherein L is to be substituted in μm. Preferably, the proportion of secondary fines in the pulp having a high fines content is at least 40%, particularly preferably at least 60%, each with respect to the total length of the fibers in the pulp having a high fines content. The proportion of secondary fines can also be determined by an image analysis method in accordance with ISO 16065-2:2014.

DESCRIPTION OF SOME PREFERRED EMBODIMENTS

Figure 1A:
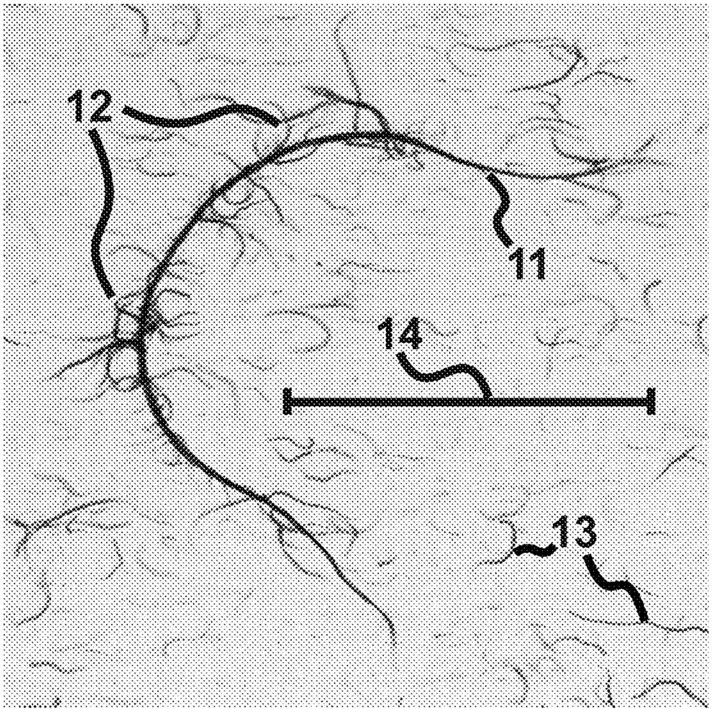
FIG. 1 shows, in FIGS. 1*a* to 1*i*, examples of fibrillated fibers of regenerated cellulose with a branched structure after dissolution of a separator according to the invention in water.
Figure 1B:
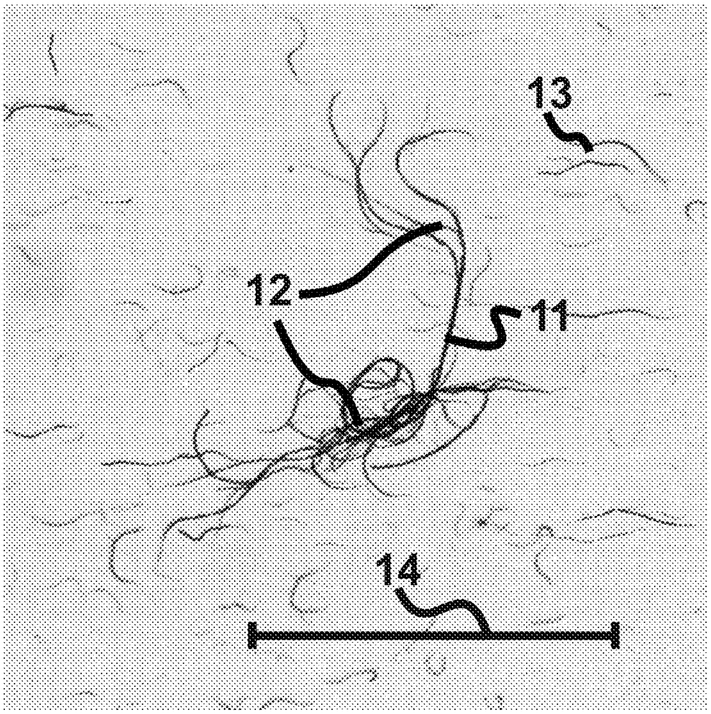
Figure 1C:
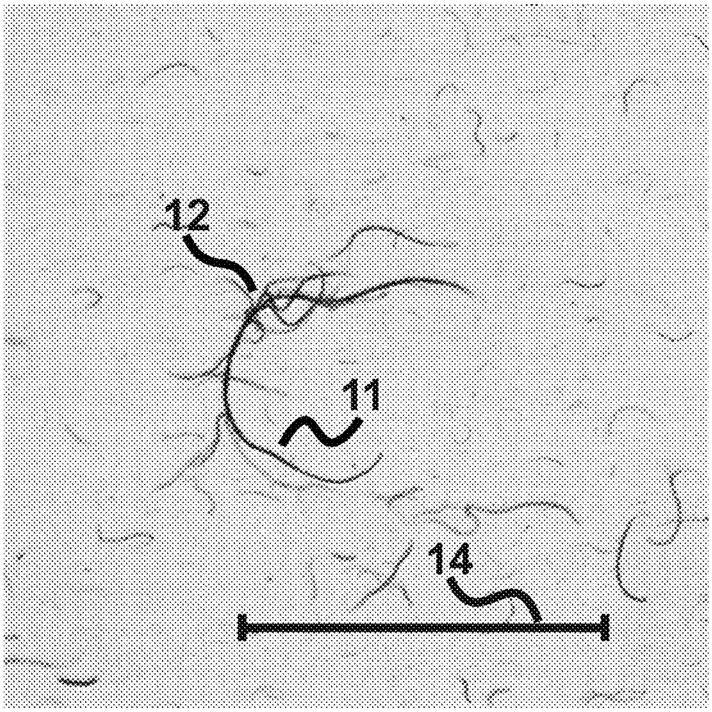
Figure 1D:
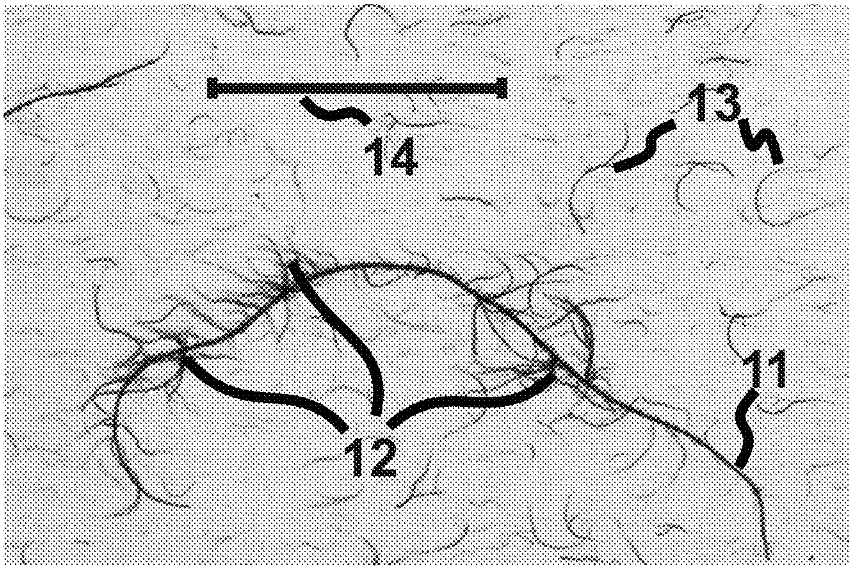
Figure 1E:
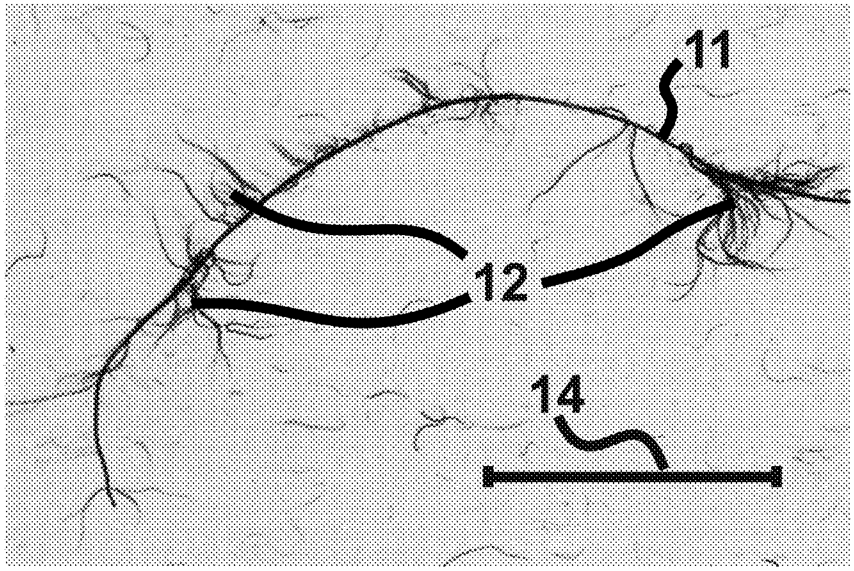
Figure 1F:
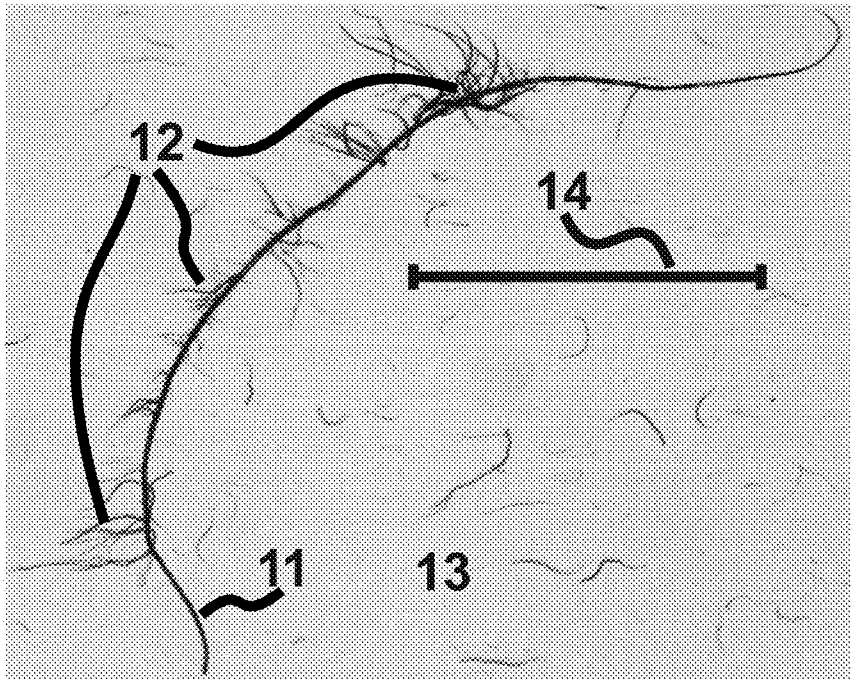
Figure 1G:
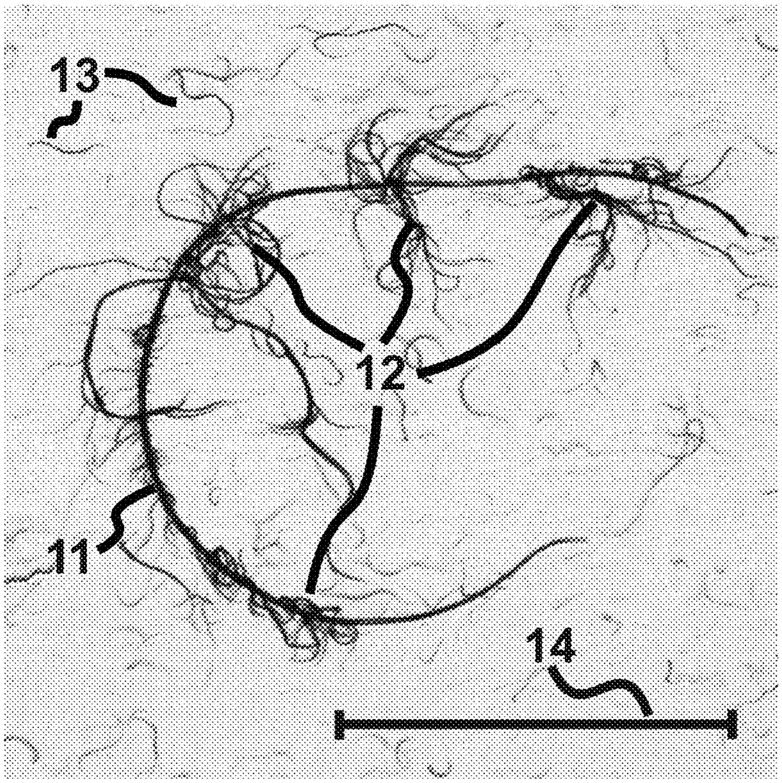
Figure 1H:
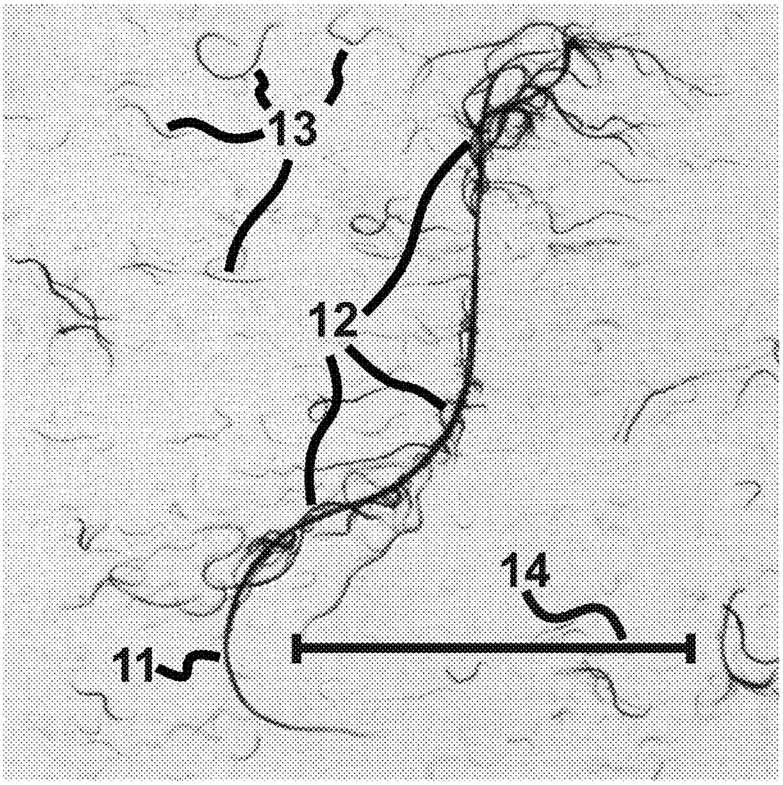
Figure 1I:
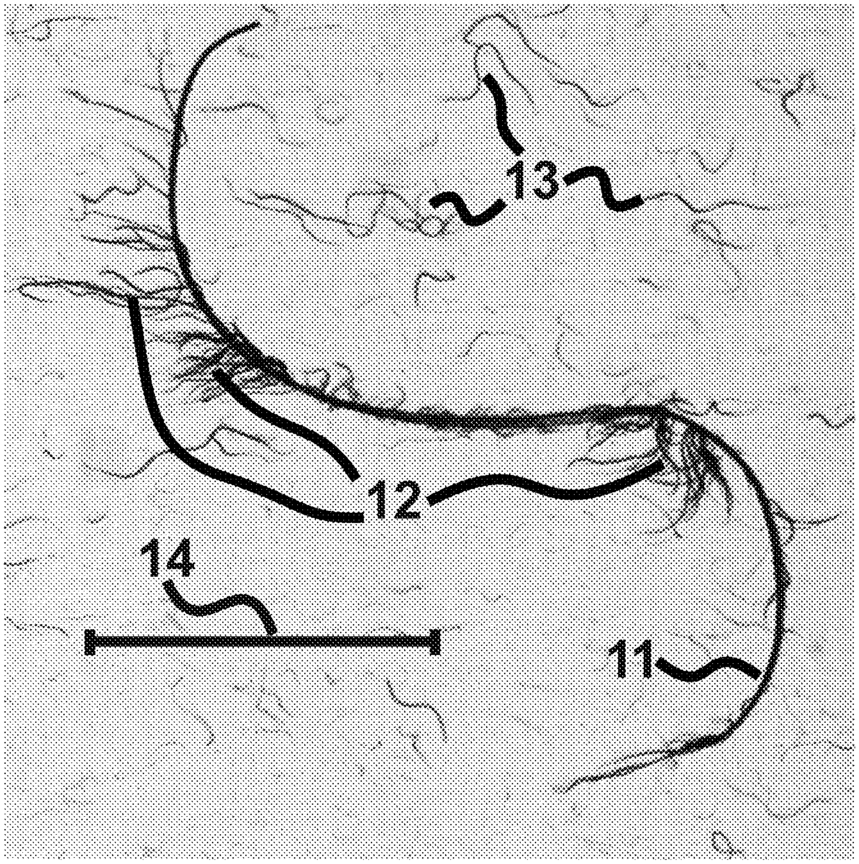

Some preferred embodiments of separators according to the invention and of the process according to the invention as well as separators not according to the invention as comparative examples will be described below.

An aqueous suspension of 4 mm-long fibrillated fibers of regenerated cellulose (LYOCELL®) with 1.7 dtex was produced, step A, and refined in a colloid mill to a degree of refining of 82° SR or 93° SR, respectively, measured in accordance with ISO 5267-1:1999. Next, the suspension was transported to a headbox, step C, and there the pulp having a high fines content was added to the head box, step (b). Then a fiber web was formed on a paper machine, dried, and wound up according to the steps D to H.

The quantities of fibers of regenerated cellulose and of pulp having a high fines content were selected such that the separator was formed by 85% to 100% fibers of regenerated cellulose and by 0%, 10% or 15% pulp having a high fines content, wherein the percentages are with respect to the mass of the finished and dried separator. In total, three separators according to the invention, S1, S2 and S3, and two separators not according to the invention, P1 and P2, were produced, and by calendering S1, a fourth separator according to the invention, S4, and by calendering P1, a further separator not according to the invention, P3, were produced. The properties of S1, S2, S3, S4 and P1, P2, P3 are summarized in Tables 1 and 2, wherein the mass of LYOCELL® fibers, the mass of pulp having a high fines content (HFP), the degree of refining (DR), the basis weight (BW), the thickness (TH), the tensile strength in the machine direction (TS-MD) and the modulus of elasticity in the machine direction (MoE-MD) are provided in Table 1 and for the same separators the porosity (PV), the air permeability (AP), the mean flow pore size (M-PS), the standard deviation of the mean flow pore size (SD-PS) and the flow pore size $D_{90}$ (90%-PS), as defined above, are shown in Table 2.

TABLE 1

| | Lyocell ® % | HFP % | DR °SR | BW g/m$^2$ | TH μm | TS-MD kN/m | MoE-MD GPa |
|---|---|---|---|---|---|---|---|
| S1 | 90 | 10 | 93 | 14.3 | 34.5 | 0.82 | 2.79 |
| S2 | 90 | 10 | 93 | 15.0 | 35.1 | 1.04 | 2.98 |
| S3 | 85 | 15 | 82 | 15.6 | 52.9 | 0.85 | 1.85 |
| S4 | 90 | 10 | 93 | 14.3 | 18.6 | 0.67 | 4.86 |
| P1 | 100 | 0 | 93 | 13.5 | 33.9 | 0.76 | 2.40 |
| P2 | 100 | 0 | 82 | 15.5 | 59.9 | 0.53 | 1.29 |
| P3 | 100 | 0 | 93 | 13.5 | 19.4 | 0.65 | 3.76 |

TABLE 2

| | PV % | AP S | M-PS nm | SD-PS nm | 90%-PS nm |
|---|---|---|---|---|---|
| S1 | 72 | 62.0 | 175 | 108 | 365 |
| S2 | 72 | 89.4 | | | |
| S3 | 80 | 18.1 | 340 | 446 | 971 |
| S4 | 45 | 164.7 | 109 | 69 | 264 |
| P1 | 73 | 17.4 | 275 | 146 | 426 |
| P2 | 83 | 2.6 | 879 | 545 | 1149 |
| P3 | 52 | 55.6 | 174 | 79 | 319 |

The air permeability (AP) can serve as a measure of the porosity and it can be seen that the separators according to the invention S1, S2 compared with P1 and S3 compared with S2 respectively have, at comparable porosity, a significantly lower air permeability, i.e. higher values according to Gurley. This is an indication that the mean flow pore size is lower in the separators according to the invention, for which reason these separators are better suited for use in electrochemical elements than the separators not according to the invention.

In particular, the separator not according to the invention P2 has a very high air permeability, i.e. a low value according to Gurley, and thus large pores, for which reason there is the danger that in an electrochemical element, in particular a lithium-ion battery with this separator, over time, dendrites could be formed starting from the electrodes, reducing the lifespan and performance of the electrochemical element.

A comparison of the separators according to the invention S1, S2 and S3 with the separators not according to the invention P1 and P2 without pulp having a high fines content also shows the positive effect of the pulp having a high fines content on the strength of the separator.

The pore size distribution of the separators S1 and P1 was determined by capillary flow porosimetry in accordance with ASTM F316-03(2019) *Standard Test Method for Pore Size Characteristics of Membrane Filters by Bubble Point and Mean Flow Pore Test.*

For S1, a mean flow pore size of 175 nm was found at a standard deviation of the mean flow pore size of about 108 nm, while the separator not according to the invention, P1, had a mean flow pore size of 275 nm at a standard deviation of the mean flow pore size of about 146 nm. The pulp having a high fines content in the separator according to the invention S2 thus leads to a lower mean flow pore size and a pore size distribution with a smaller standard deviation, both of which are advantageous for the properties of an electrochemical element manufactured therefrom.

FIGS. 1*a* to 1*i* show examples of fibrillated fibers of regenerated cellulose with a length of at least 1 mm and a branched structure, wherein in each of the FIGS. 1*a* to 1*i*, identical numerals refer to similar objects. In this regard, a separator according to the invention was dissolved in water and images of the fibers were acquired with the L&W Fiber Tester Plus from the company Lorentzen & Wettre. The branched structure is characterized in that several fibrils 12 are bound to the fiber 11 and thereby form branches of the fiber 11. In addition, there were also fibrils 13 that were no longer bound to the fiber 11. The length 14 in each of the FIGS. 1*a* to 1*i* is respectively 1 mm and shows, that the fiber 11 is longer than 1 mm. The FIGS. 1*a* to 1*i* just serve as an example and fibrillated fibers of regenerated cellulose, as they occur in the separator according to the invention, can also have a substantially different shape, as long as the essential elements 11 and 12 of the branched structure are present and the fibers have a length of at least 1 mm.

Figure 2A:
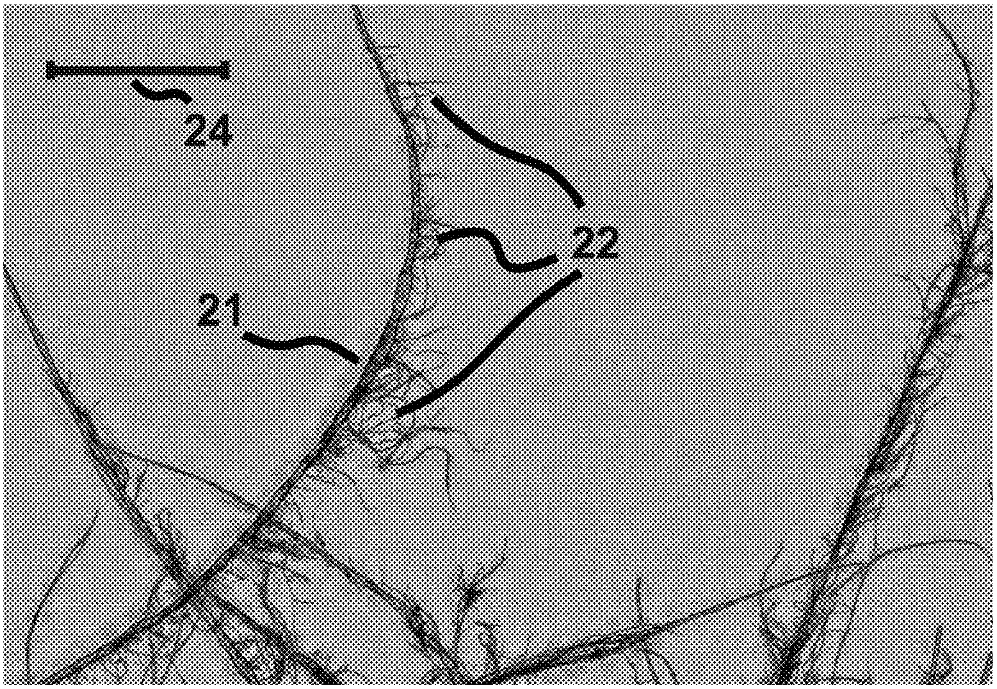
FIG. 2 shows, in FIGS. 2*a* to 2*c*, examples of fibrillated fibers of regenerated cellulose with a branched structure at the tearing edge of a separator according to the invention by image acquisition with a light microscope.
Figure 2B:
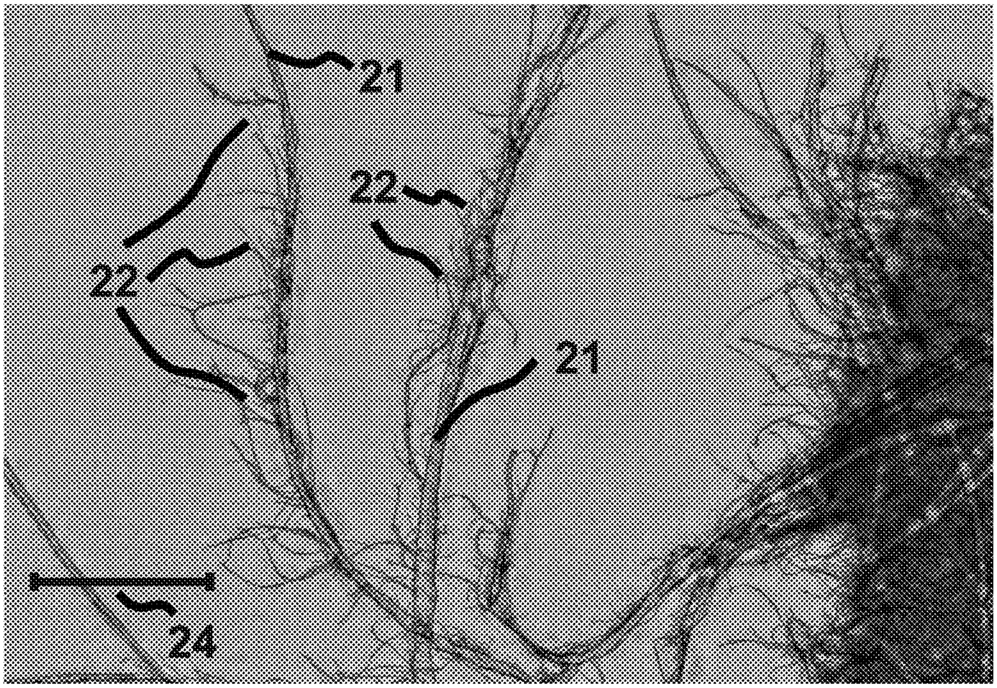
Figure 2C:
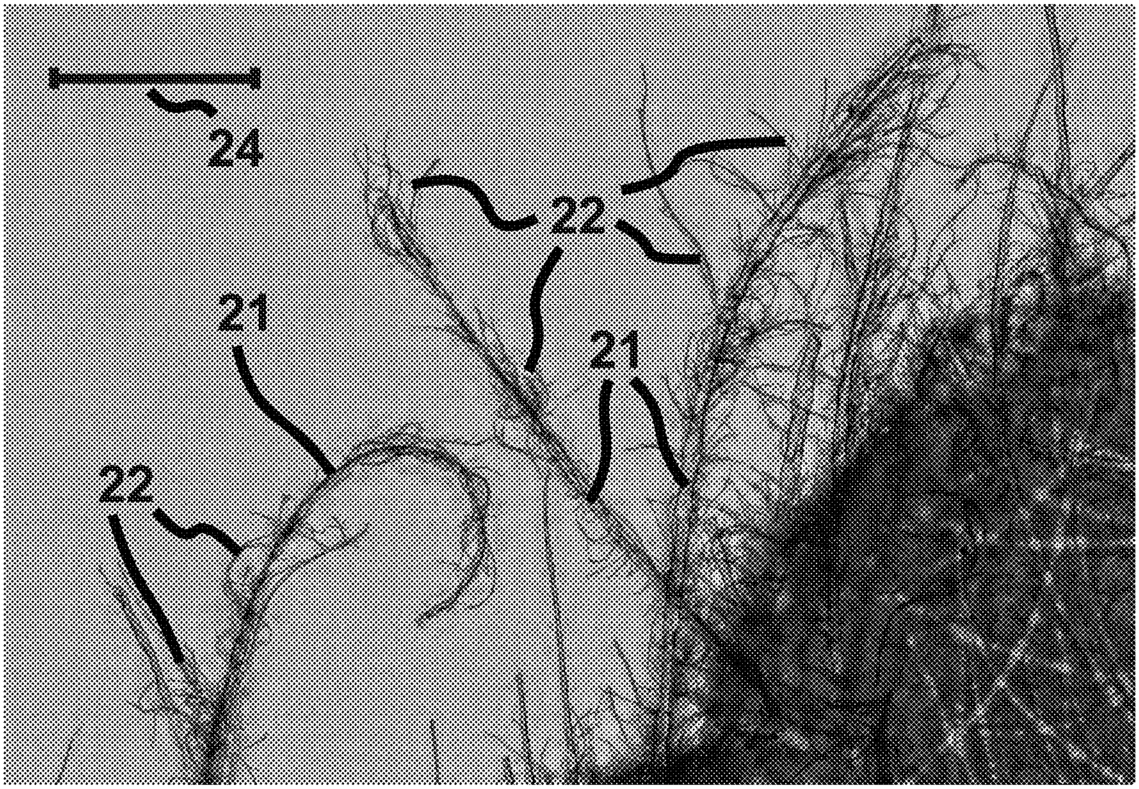

FIGS. 2*a* to 2*c* show examples of fibrillated fibers of regenerated cellulose with a length of at least 1 mm and a branched structure, wherein in each of FIGS. 2*a* to 2*c*, identical numerals also designate similar objects. In this regard, a separator according to the invention was torn into two parts and images of the fibers were acquired at the torn edge with a light microscope. The branched structure is characterized in that several fibrils 22 are bound to the fiber 21 and thus form branches of the fiber 21. The length 24 in each of the FIGS. 2*a* to 2*c* is 200 μm and shows that the fiber 21 is longer than 1 mm. FIGS. 2*a* to 2*c* also just serve as an example and fibrillated fibers of regenerated cellulose, as they occur in the separator according to the invention, can also have a substantially different shape, as long as the essential elements 21 and 22 of the branched structure are present and the fibers have a length of at least 1 mm.

Figure 3A:
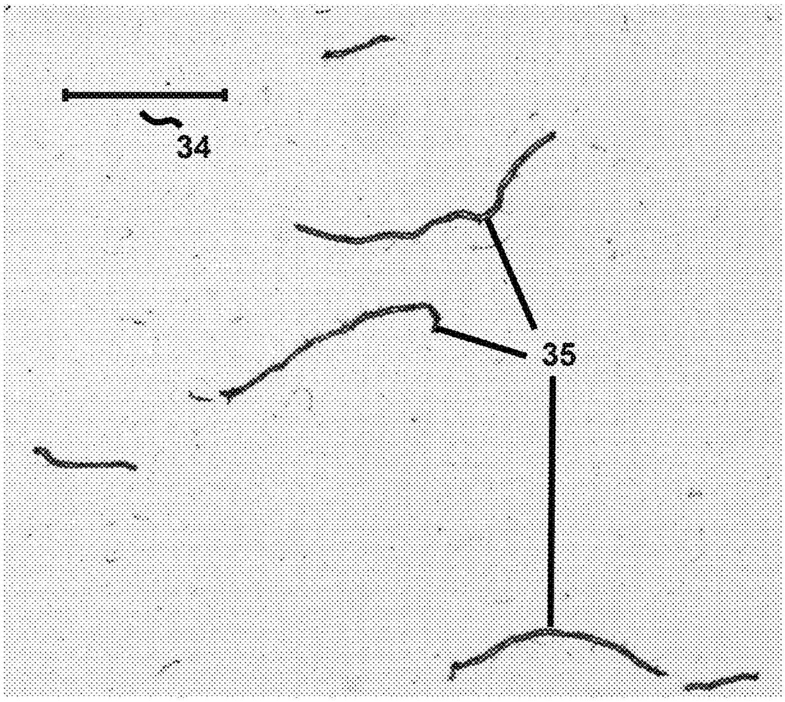
FIG. 3 shows, in FIGS. 3*a* and 3*b*, examples of fibrillated fibers of regenerated cellulose which do not have a branched structure.
Figure 3B:
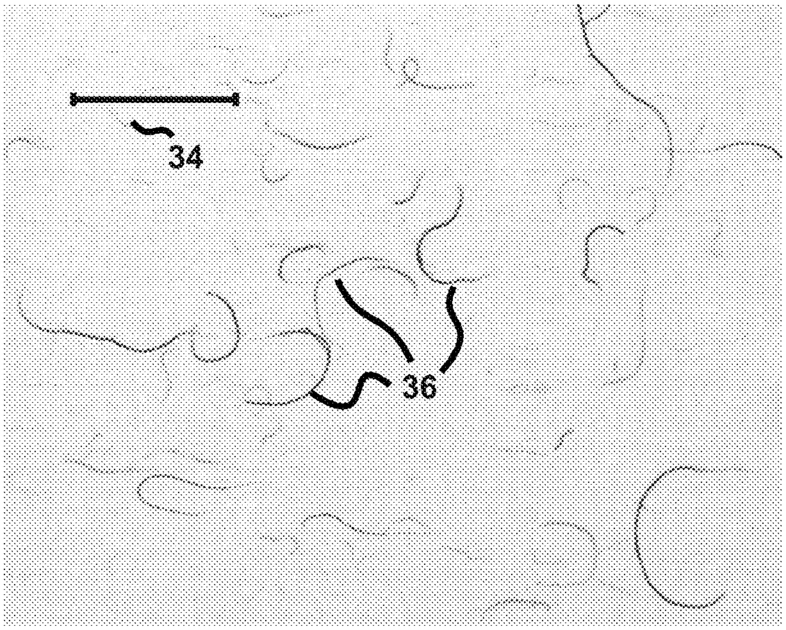

FIGS. 3*a* and 3*b* show, by way of example, fibrillated fibers of regenerated cellulose that do not have a branched structure. The images were also acquired with the L&W Fiber Tester Plus from the company Lorentzen & Wettre. The length 34 is 500 μm in each of FIGS. 3*a* and 3*b*. In FIG. 3*a*, by way of example, fibrillated fibers 35 are shown, which are produced by refining regenerated cellulose, wherein the refining primarily leads to a shortening of the fibers. Such fibers do not exhibit a branched structure, because the fibrils are not sufficiently released from the fiber 35. The fibers do not form a sufficiently tight network to retain the fines in the fiber network.

In FIG. 3*b*, fibrillated fibers 36 are shown by way of example that are produced by intense refining of regenerated cellulose, wherein the refining has led to a complete separation of the fibrils from the fiber. The fibrillated fibers 36 also do not exhibit a branched structure and they are thus not suitable for forming a sufficiently dense fiber network.

From FIGS. 1 to 3, it can be seen that refining the fibers is of great importance for the fiber morphology and it is only by appropriate selection of the refining process, for example in a colloid mill, that the fibers with a branched structure and a length of at least 1 mm, as shown in FIGS. 1 and 2, can be obtained in sufficient quantity.

The separator according to the invention S1 and the separator not according to the invention P1 were also further calendered with a calender with 8 nips at a line load of 150 kN/m and thus a further separator according to the invention S4 from S1 and a separator not according to the invention P3 from P1 were obtained. The pore size distribution of the separators S4 and P3 were determined by capillary flow porosimetry. A comparison of S1 with S4 and P1 with P3 shows that by calendering, the mean flow pore size can be reduced and at the same time, the air permeability also decreases.

From the separators according to the invention S1, S2 and S3 lithium-ion batteries were manufactured, and the principal function was confirmed, so that the separators are in any case suitable for use in lithium-ion batteries or other electrochemical elements.

In addition, the separators not according to the invention P1 and P2 are in principle suitable for lithium-ion batteries or other electrochemical elements, but their properties are not as good as the separators according to the invention.

The invention claimed is:

1. Separator for an electrochemical element,
wherein at least 70% and at most 95% of the mass of the separator is formed by fibrillated fibers of regenerated cellulose and at least 3% and at most 30% of the mass of the separator is formed by pulp having a fines content,
wherein in the pulp having a fines content, the proportion of fibers with a length of less than 0.2 mm is at least 70% with respect to the total length of the fibers in the pulp having a fines content,
wherein of the fibrillated fibers of regenerated cellulose with a length of at least 1 mm, at least 10% with respect to number, has a branched structure, and
wherein said separator is either free of plastic fibers, or contains plastic fibers in an amount of less than 5% of the mass of the separator.

2. Separator according to claim 1, wherein of the fibrillated fibers of regenerated cellulose with a length of at least 1 mm, at least 20% with respect to number have said branched structure.

3. Separator according to claim 1, wherein at least 75% and at most 90% of the mass of the separator is formed from the fibrillated fibers of regenerated cellulose.

4. Separator according to claim 1, wherein the mean linear density of the fibrillated fibers of regenerated cellulose before fibrillation is at least 0.8 g/10000 m (0.8 dtex) and at most 3.0 g/10000 m (3.0 dtex).

5. Separator according to claim 1, wherein the mean length of the fibrillated fibers of regenerated cellulose before fibrillation is at least 2 mm and at most 8 mm.

6. Separator according to claim 1, wherein at least 5% and at most 20% of the mass of the separator is formed by the pulp having a fines content.

7. Separator according to claim 1, wherein the proportion of pulp fibers with a length of less than 0.2 mm is at least 80% with respect to the total length of the fibers in the pulp having a fines content.

8. Separator according to claim 1, wherein the pulp having a fines content is formed by nano-fibrillated pulp or micro-fibrillated pulp.

9. Separator according to claim 1, wherein the pulp having a fines content contains secondary fines which are formed by fibers the length L of which in μm is less than 100 and the thickness D in μm of which satisfies the inequality $$D \leq 50 - 0.3 \cdot L,$$

wherein the proportion of said secondary fines in the pulp having a fines content is at least 40% with respect to the total length of the fibers in the pulp having a fines content.

10. Separator according to claim 1 which, in addition to said fibrillated fibers of regenerated cellulose and the pulp having a fines content contains further fibers which are selected from the group consisting of fibers from cellulose derivatives, non-fibrillated fibers from regenerated cellulose, glass fibers and plastic fibers, wherein the plastic fibers are fibers from polyolefins, fibers from polyesters, fibers from polyethers, polysulfones, polyurethanes, polyamides, polyimides, polyvinyl alcohol, polyacrylonitrile, polyphenylene sulfide or from ethylene-vinylacetate co-polymers, wherein the total proportion of these further fibers is at most 10% of the mass of the separator.

11. Separator according to claim 1 the thickness of which, determined on a single sheet in accordance with ISO 534:2011, is at least 12 μm and at most 35 μm.

12. Separator according to claim 1 the basis weight of which, determined in accordance with ISO 536:2012, is at least 12 $g/m^2$ and at most 25 $g/m^2$.

13. Separator according to claim 1 the mean flow pore size of which, measured by capillary flow porosimetry in accordance with ASTM F316-03(2019), is at least 50 nm and at most 800 nm.

14. Separator according to claim 1, wherein the standard deviation of the mean flow pore size measured in accordance with ASTM F316-03(2019) is at least 3 nm and at most 200 nm.

15. Separator according to claim 1, which has a value $D_{90}$ for a distribution of a flow pore size which is at least 100 nm and at most 1500 nm, wherein $D_{90}$ is to be determined such that 90% of the flow is through pores the flow pore sizes of which do not exceed the value $D_{90}$.

16. Separator according to claim 1 the modulus of elasticity of which, determined in a measurement of a force-strain curve in accordance with ISO 1924-2:2008 in at least one direction is at least 1 GPa and at most 8 GPa.

17. Separator according to claim 1 the air permeability according to Gurley of which, determined in accordance with ISO 5636-5:2013, is at least 10 s and at most 450 s.

18. Process for manufacturing a separator according to claim 1 for an electrochemical element, which comprises the following steps, A—manufacturing an aqueous suspension of fibers of regenerated cellulose which can be fibrillated, B—fibrillating the fibers of regenerated cellulose from step A, C—adding the aqueous suspension of fibrillated fibers of regenerated cellulose from step B to a head box, D—applying the aqueous suspension from step C to a running wire to form a fiber web, E—de-watering the fiber web on the running wire, F—drying the fiber web in a first drying device, G—drying the fiber web from step F in a second drying device, H—winding up a separator formed by the fiber web from step G, wherein the fibers of regenerated cellulose in step C are fibrillated such that of the fibers with a length of at least 1 mm, at least 10% of the fibers, with respect to number, have a branched structure, and wherein the pulp having a fines content is added in at least one of the following steps, (a) in the step A, by addition to the aqueous suspension, (b) in the step B, by addition to the head box, (c) in the step D, by application to the fiber web formed on the running wire from a further head box, (d) between the steps E and F, by application to the fiber web in an application device, or (e) between the steps G and H, by application to the fiber web in an application device, and wherein in the pulp having a fines content, at least 70% of the fibers with respect to the total length of the fibers have a length of less than 0.2 mm, and wherein at least 70% and at most 95% of the mass of the separator after drying in step G is formed by the fibrillated fibers of regenerated cellulose and at least 3% and at most 30% of the mass of the separator is formed by the pulp having a fines content, and wherein the step B is carried out in a colloid mill.

19. Process according to claim 18, wherein the step B is carried out such that in the fibrillated fibers of regenerated cellulose after step B, at least 30% and at most 70% of the total length of the fibers is formed by fibers with a length of less than 0.2 mm.

20. Process according to claim 18, wherein a calendering is carried out between steps (e) and H.

21. Process according to claim 18, wherein the application of at least a part of the pulp having a fines content in the step (d) is carried out by a film press or a coating device.

22. Process according to claim 18, wherein the application of at least a part of the pulp having a fines content in the step (e) is carried out by printing or spraying, wherein the application of the pulp having a fines content is on both sides.

23. Process according to claim 18, wherein at least 75% and at most 90% of the mass of the separator from the step H is formed by the fibrillated fibers of regenerated cellulose.

24. Process according to claim 18, wherein the mean length of the fibrillated fibers of regenerated cellulose in the step A is at least 2 mm and at most 8 mm.

25. Process according to claim 18, wherein at least 5% and at most 20% of the mass of the separator from the step H is formed by the pulp having a fines content.

26. Process according to claim 18, wherein, for the pulp having a fines content from at least one of the steps (a) to (e), the proportion of fibers with a length of less than 0.2 mm is at least 80%, with respect to the total length of the fibers in the pulp having a fines content.

27. Process according to claim 18, wherein the pulp having a fines content from at least one of the steps (a) to (e) contains secondary fines which are formed by fibers the length L in μm of which is less than 100 and the thickness D in μm of which satisfies the inequality $$D \leq 50 - 0.3 \cdot L,$$

wherein the proportion of secondary fines in the pulp having a fines content is at least 40% with respect to the total length of the fibers in the pulp having a fines content.

28. Process according to claim 18, wherein the fiber web is passed through at least 2 and at most 14 nips, wherein mechanical pressure is exerted on the fiber web.

29. Process according to claim 28, wherein a line load which is exerted on the fiber web in at least a part of the nips is at least 20 kN/m and at most 600 KN/m.

30. Electrochemical element which comprises two electrodes, an electrolyte and a separator according to claim 1.

31. Electrochemical element having a separator according to claim 1, which is formed by a capacitor, a hybrid capacitor, a supercapacitor or an accumulator.

* * * * *